(12) United States Patent
Kirchner et al.

(10) Patent No.: US 8,091,870 B2
(45) Date of Patent: Jan. 10, 2012

(54) SELF-PUMPING HYDROPNEUMATIC SPRING STRUT

(75) Inventors: Holger Kirchner, Ruppichteroth (DE); Thomas Meyer, Siegburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 715 days.

(21) Appl. No.: 12/231,943

(22) Filed: Sep. 8, 2008

(65) Prior Publication Data

US 2009/0066041 A1    Mar. 12, 2009

(30) Foreign Application Priority Data

Sep. 8, 2007   (DE) .......................... 10 2007 042 865

(51) Int. Cl.
*F16F 9/43*     (2006.01)
(52) U.S. Cl. ................................ 267/64.17; 267/DIG. 2
(58) Field of Classification Search ............... 267/64.17, 267/64.28, DIG. 1, DIG. 2
See application file for complete search history.

(56) References Cited

U.S. PATENT DOCUMENTS

| | | | | |
|---|---|---|---|---|
| 3,033,556 | A * | 5/1962 | Wossner | 267/64.19 |
| 4,449,552 | A * | 5/1984 | Porel | 138/30 |
| 6,467,760 | B2 * | 10/2002 | Lutz | 267/64.28 |
| 6,648,309 | B2 | 11/2003 | Beck | |
| 7,306,079 | B2 * | 12/2007 | Beck | 188/322.2 |
| 7,487,863 | B2 * | 2/2009 | Ackermann | 188/277 |
| 7,568,562 | B2 * | 8/2009 | Beck | 188/313 |
| 7,918,437 | B2 * | 4/2011 | Ackermann | 267/64.27 |
| 2002/0105118 | A1 * | 8/2002 | Beck | 267/64.27 |
| 2009/0065991 | A1 * | 3/2009 | Kirchner et al. | 267/124 |

FOREIGN PATENT DOCUMENTS

DE         101 04 358 C1    10/2002

* cited by examiner

*Primary Examiner* — Bradley King
(74) *Attorney, Agent, or Firm* — Cozen O'Connor

(57) ABSTRACT

A self-pumping hydropneumatic spring strut is provided to have internal level control. The spring strut has an outer tube having one end sealed by a piston rod guide, a working cylinder received inside the outer tube, and a hollow piston rod extending into the working cylinder through the piston rod guide. The piston rod carries a piston, which is operable to travel axially inside the working cylinder in a sealing manner and separates the working cylinder into first and second working spaces. The first working space is under a high-pressure from a high-pressure chamber and acting as a spring and the second working space is located on a piston rod-side. The spring strut also has a pump rod received inside the hollow piston rod. The pump rod and the hollow piston rod form a piston pump, which, in response to sprung movements acted thereonto, conveys a damping media from a low-pressure chamber into the first working space connected to the high-pressure chamber. The high-pressure chamber and the low-pressure chamber are each connected to the atmosphere by a filling connection formed in the piston rod guide and a check valve operable to selectively communicate the high-pressure or the low-pressure chamber to the atmosphere.

9 Claims, 3 Drawing Sheets

SELF-PUMPING HYDROPNEUMATIC SPRING STRUT

BACKGROUND OF THE INVENTION

1. Field of the Invention

The invention pertains to a self-pumping hydropneumatic spring strut with internal level control, especially for use in motor vehicles.

2. Description of the Related Art

Self-hydropneumatic spring struts are already known. For example, in DE 101 04 358 C1, FIGS. 7 and 8 show a high-pressure chamber connected to a flow connection located in a piston rod guide. A filling bore is located in an outer tube and lines up with the flow connection before the piston rod guide is fully installed. After the piston rod guide has been inserted axially into the outer tube, the filling bore is closed off by the piston rod guide. A closed envelope body of variable shape is provided as a high-pressure chamber. The wall of the envelope body includes a gas-tight barrier layer.

With this configuration, internal parts, such as the high-pressure chamber, a piston, a piston rod, and a pump rod can be introduced axially into the outer tube of the spring strut, together with the piston rod guide. The spring strut is functional after at least the high-pressure chamber is filled with a pressurized gas via the filling bore. After the piston rod guide together with the working cylinder and other internal parts are further inserted into the outer tube, the filling bore is closed off by the piston rod guide. After the outer tube is been flanged over, the spring strut is completely assembled.

To allow this axial insertion of the piston rod guide, the seal between the piston rod guide and the piston rod is subjected to an appropriately high degree of pretension. This means that a correspondingly large amount of friction is present. A highly stressed single seal of this type tends to lead to leakage to the atmosphere, because the seal must withstand all the internal pressure.

SUMMARY OF THE INVENTION

The invention provides a self-pumping hydropneumatic spring strut with internal level control, in which the axial insertion process under pressure can be eliminated without losing the ability to fill the two pressure chambers with gas and oil as necessary for the proper functioning of the strut.

A self-pumping hydropneumatic spring strut is provided to have internal level control. The spring strut has an outer tube having one end sealed by a piston rod guide, a working cylinder received inside the outer tube, and a hollow piston rod extending into the working cylinder through the piston rod guide. The piston rod carries a piston, which is operable to travel axially inside the working cylinder in a sealing manner and separates the working cylinder into first and second working spaces. The first working space is under a high-pressure from a high-pressure chamber and acting as a spring and the second working space is located on a piston rod-side. The spring strut also has a pump rod received inside the hollow piston rod. The pump rod and the hollow piston rod form a piston pump, which, in response to sprung movements acted thereonto, conveys a damping media from a low-pressure chamber into the first working space connected to the high-pressure chamber.

In one embodiment, two filling connections are provided in the piston rod guide. One of the filling connections establishes a connection to the high-pressure chamber, and the other one of the filling connections establishes a connection to the low-pressure chamber. The filling connections can be used as a conduit to fill the corresponding pressure chambers with pressured gas and/or oil. In one example, an axial filling bore is provided in the piston rod guide for filling the low-pressure chamber with pressure (gas and/or oil). For example, the filling bore is open out directly or indirectly into the low-pressure chamber.

In another embodiment, the filling bore is open out directly or indirectly into a flow connection. The flow connection can be formed in the piston rod guide and connect to the low-pressure chamber directly or indirectly via the low-pressure filling connection. The flow connection has the effect of returning leaking oil back to the low-pressure chamber.

The flow connection is located between first and second seals, which are axially arranged with respect to each other. The internal pressure proceeding from the working space acts first on the first seal, whereas the following, second seal is subject to a lower pressure. Friction is reduced as a result of the lower pretension of the seals on the piston rod. Additionally, the effectiveness of the seal in preventing pressurized gas or even damping medium from escaping against the atmosphere is increased.

Each of the two filling connections is provided with at least one check valve. The check valve in the low-pressure filling connection simultaneously can serve as a gas barrier, so that the gas present in the low-pressure chamber cannot escape into the atmosphere via the gap between the piston rod guide and the piston rod.

In one embodiment, an O-ring valve is provided as a check valve selectively sealing the low-pressure chamber from at least one of the low-pressure filling connection and the flow connection. For example, a standard series O-ring can be used as the check valve, which allows the low-pressure chamber to be filled with gas during the filling of the low-pressure chamber. When the filling process is over and the external pressure is removed, the valve prevents the pressurized gas from escaping to the outside either via the filling bore or via the gap between the piston rod guide and the piston rod.

After testing, the filling bore is sealed off by a rubber ball and closed off from the outside by a steel ball (not shown), which, for the sake of safety, can also be peened in place. In one embodiment, the filling bore is simultaneously sealed off and closed from the outside, such as by a plug.

In another embodiment, a rubber ball is installed in the piston rod guide before assembling and possibly pretensioned by a spring. In this embodiment, the bore through which the rubber ball is installed is closed off after assembling.

According to another embodiment, the high-pressure chamber is also closed off by a rubber ball as a check valve after the high-pressure chamber is filled. In one embodiment, a filling bore is used to hold a filling nipple, which holds the rubber ball in position during the filling process. Upon completion of the filling process, the external pressure is released; the ball settles in a stepped-down, smaller bore and thus closes off the filling bore.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred exemplary embodiments of the invention are illustrated schematically in the drawings.

DETAILED DESCRIPTION OF THE EMBODIMENTS

Figure 1:
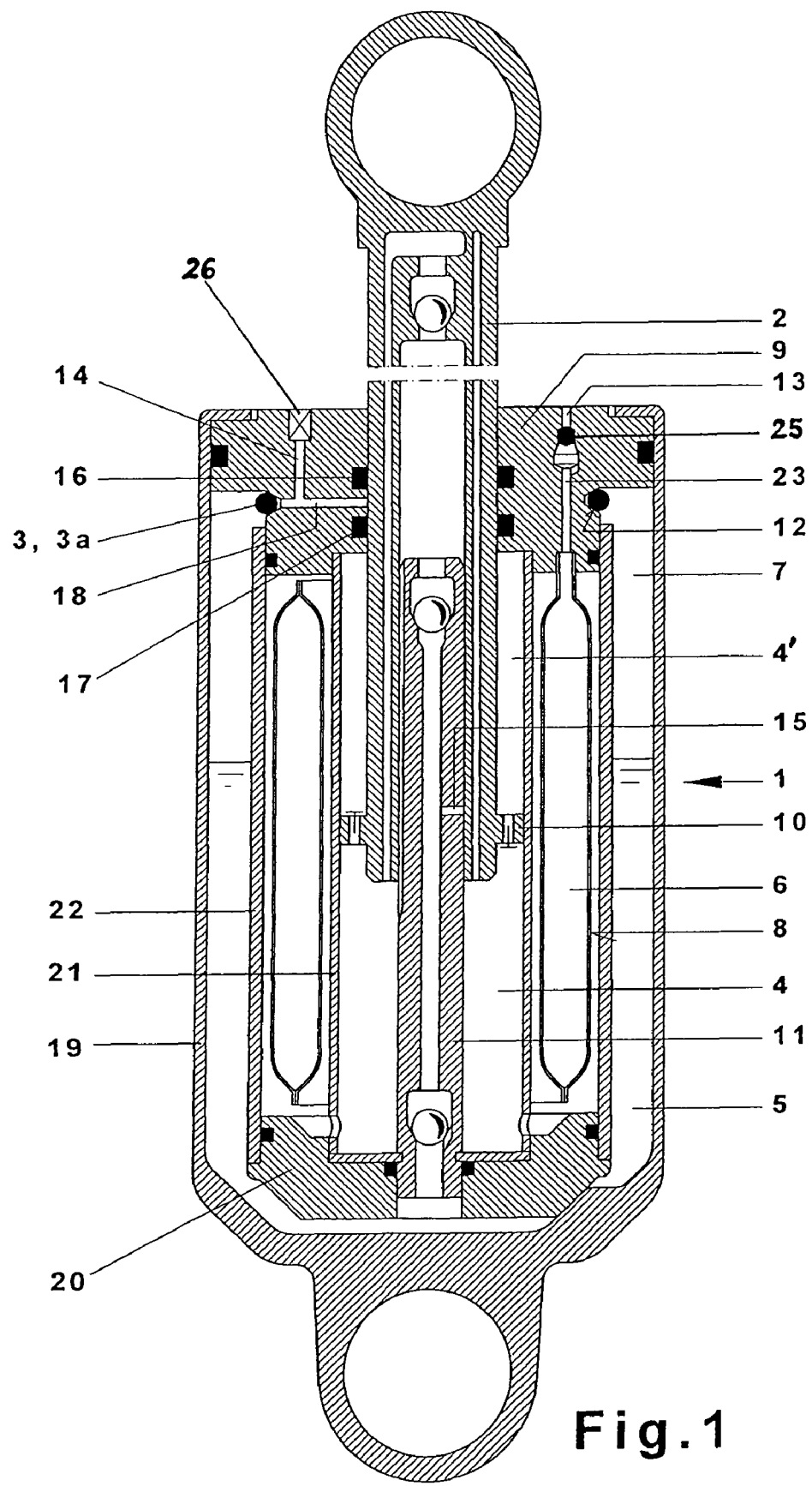
FIG. 1 shows a cross section of an embodiment of a self-pumping hydropneumatic spring strut with internal level control.

FIG. 1 shows a self-pumping hydropneumatic spring strut 1 with internal level control, in which piston 10 is installed in a working cylinder 21 and attached to a piston rod 2. The piston rod 2 extends out of the outer tube 19 through a piston rod guide 9. A pump rod 11 is attached to a bottom piece 20. The pump rod 11 travels into a hollow space inside the piston rod 2. The piston rod 2 and the pump rod 11 together constitute a piston pump.

An intermediate tube 22 is installed coaxially inside the outer tube 19. The intermediate tube 22 cooperates with the outer tube 19 to form a low-pressure chamber 5. A high-pressure chamber 6, defined by an envelope body 8, is located between the intermediate tube 22 and the working cylinder 21. In order for appropriately pressurized gas to be introduced into the high-pressure chamber 6, this envelope body 8 can be connected to the atmosphere by a suitable bore 23 and a filling bore 13. The low-pressure chamber 5 is filled with both a damping medium and a gas volume 7.

The working cylinder 21 is installed radially inside the high-pressure chamber 6. The damping piston 10 divides the interior of the working cylinder 21 into first and second working spaces 4, 4'. For automatic control of a motor vehicle's level, a discharge bore 15 is provided in the pump rod 11 and establishes a short-circuit between the working space 4 and the hollow space in the pump rod 11, when the pump rod 2 travels outward.

Figure 1A:
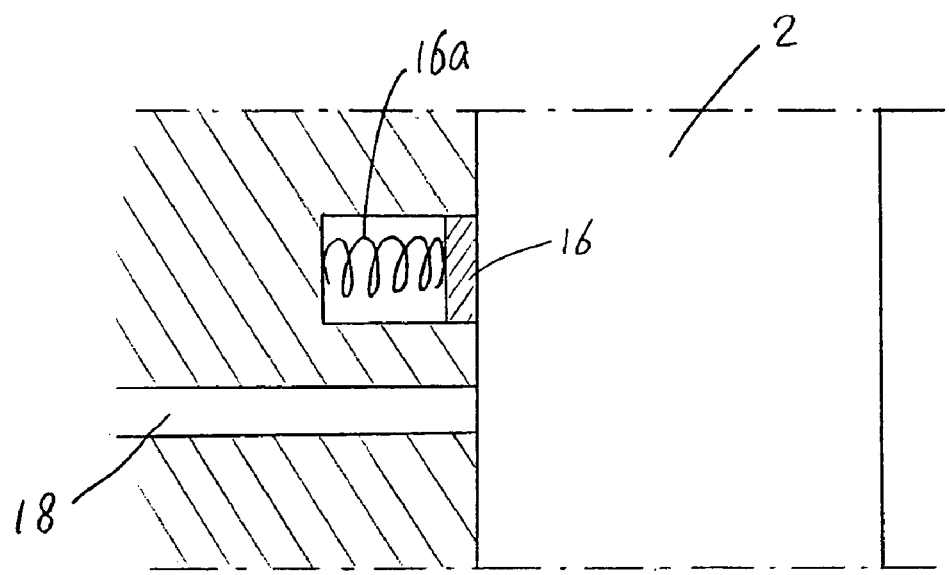
FIG. 1a is an enlarged schematic view of a sealing element showing a spring incorporated therein.

Two seals 16 and 17 are arranged in the piston rod guide 9, one axially adjacent to the other. As FIG. 1a shows schematically, the seals 16, 17 can be pretensioned, such as by a spring 16a.

Between the seals 16, 17 there is a flow connection 18, leading to the low-pressure chamber 5. This flow connection 18 also contains a check valve 3 in the form of an O-ring 3a. The O-ring 3a is held in a circumferential groove 12 and, in this embodiment, serves also as a gas barrier between the low-pressure chamber 5 and the atmosphere.

The piston rod guide 9 also has a filling bore 14, which is used to fill the low-pressure chamber 5. This filling bore 14 leads directly or indirectly to the flow connection 18 or directly (not shown) into the low-pressure chamber 5.

Figure 1C:
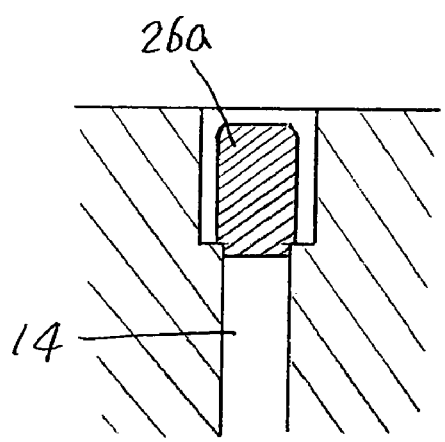
FIG. 1c is an enlarged cross section of a check valve including a plug.
Figure 1B:
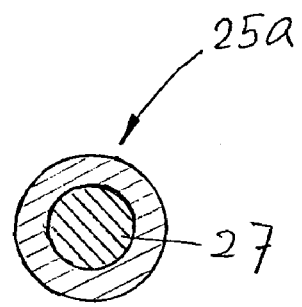
FIG. 1b is an enlarged cross section of a rubber ball held by a steel ball.

Check valves 25 and 26 are provided to close off the filling bores 13 and 14. The check valves 25, 26 can be formed in various ways. For example, at least one of the check valves 25, 26 can include a rubber ball, such as rubber ball 25a shown in FIGS. 1b, 2. Additionally or alternatively, the filling bores 13 and 14 can be closed off by a closing element, such as plug 26a shown in FIG. 1c. Other forms of check valves 25, 26 or closing element can also be used.

Figure 2:
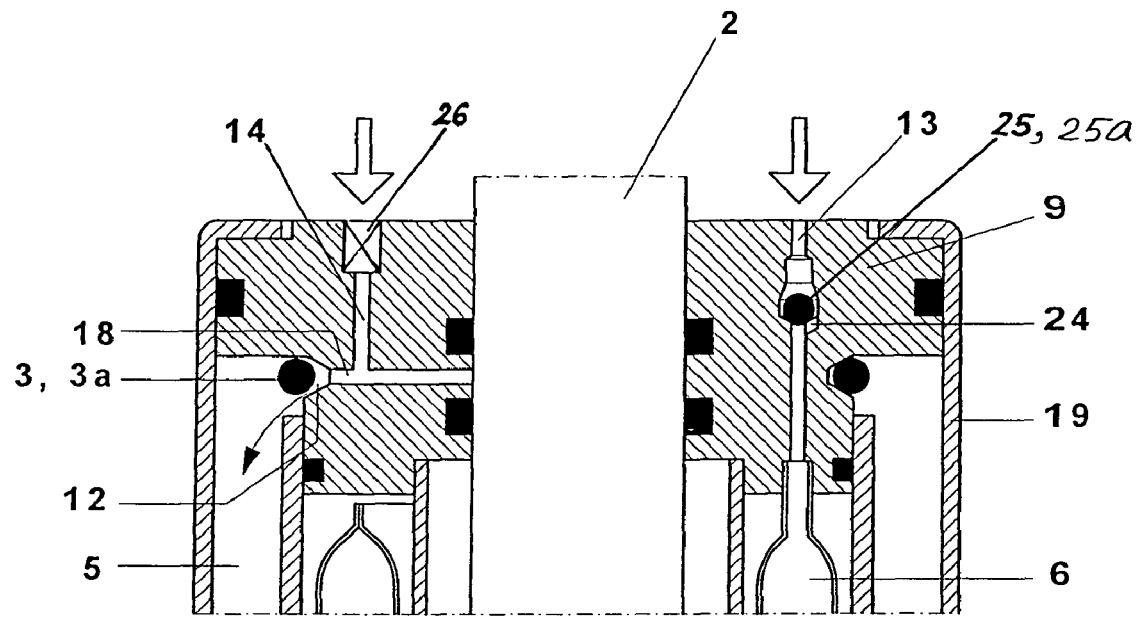
FIG. 2 shows a cross section of a piston rod guide, in isolation, with the corresponding flow connections, seals, and filling bores in a filling position.
Figure 3:
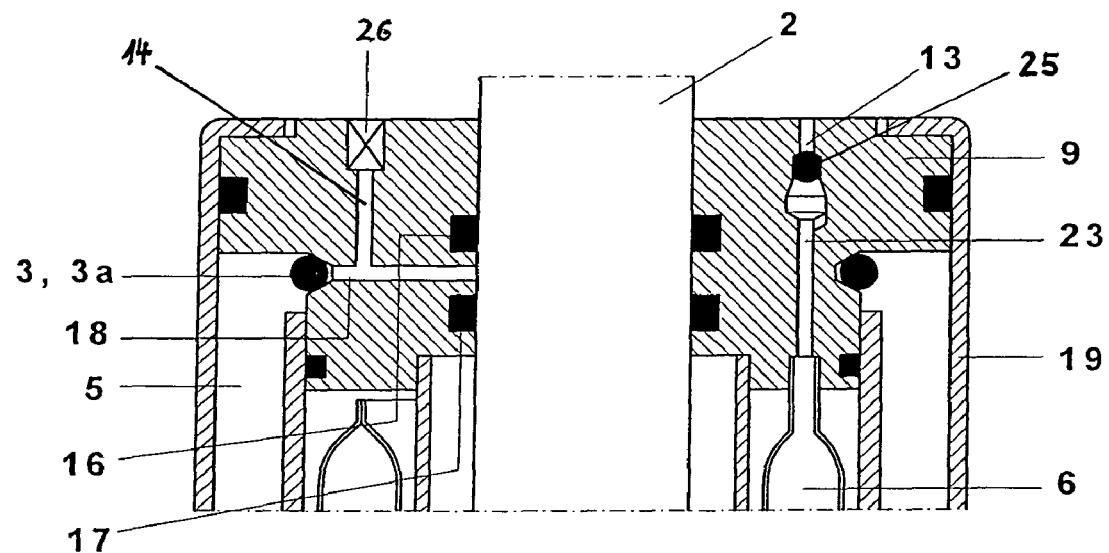
FIG. 3 shows a cross section of a piston rod guide, in isolation, with the corresponding flow connections, seals, and filling bores in a closed position.

FIGS. 2 and 3 show a piston rod guide 9 in isolation. The piston rod guide 9 is located between the outer tube 19 and the piston rod 2. The bore 23 and the filling bore 13 are used to fill the high-pressure chamber 6 with a pressurized gas, whereas the filling bore 14 in the piston rod guide 9 can be simultaneously used to fill the low-pressure chamber 5 with a damping medium and/or pressurized gas via the flow connection 18 and the check valve 3. The seals 16 and 17 seal off the piston rod 2 against the piston rod guide 9. To lower the friction with the piston rod 2, the flow connection 18 between the seals 16 and 17 leads into the low-pressure chamber 5, so that the damping medium entrained by the piston rod 2 during its outward movement can be carried back to the low-pressure chamber 5 via the flow connection 18.

When the high-pressure chamber 6 is to be filled with pressurized gas, as is shown in FIG. 2, the check valve 25 in the filling bore 13 is open, so that the pressurized gas can be introduced into the high-pressure chamber 6 via recess 24. After the high-pressure chamber 6 has been filled with pressurized gas, the check valve 25 in the filling bore 13 closes the filling bore 13 (see FIG. 3), so that the pressurized gas inside the high-pressure chamber 6 cannot escape therefrom. As is shown in FIG. 2, the check valve 25 can include a rubber ball 25a. In the example shown in FIG. 1b, the rubber ball 25a can be held by a steel ball 27.

When the low-pressure chamber 5 is to be filled, as is shown in FIG. 2, the O-ring 3a moves off its valve seat (i.e., the groove 12), so that pressurized gas can be introduced into the low-pressure chamber 5. After the low-pressure chamber 5 has been filled, the check valve 3 formed by O-ring 3a closes the flow connection 18 in a pressure-tight and fluid-tight manner, as is shown in FIG. 3. In one example, the filling bore 14 can be sealed and closed off by a plug 26a shown in FIG. 1c.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic spring strut with internal level control for a motor vehicle, the spring strut comprising:
   an outer tube having one end sealed by a piston rod guide;
   a working cylinder received inside the outer tube;
   a hollow piston rod extending into the working cylinder through the piston rod guide, the piston rod carrying a piston which is operable to travel axially inside the working cylinder in a sealing manner and separates the working cylinder into first and second working spaces, the first working space being under a high-pressure from a high-pressure chamber and acting as a spring, and the second working space being located on a piston rod-side; and a pump rod received inside the hollow piston rod;

wherein the pump rod and the hollow piston rod form a piston pump configured to convey a damping medium from a low-pressure chamber into the first working space connected to the high-pressure chamber, wherein the high-pressure chamber and the low-pressure chamber are each connected to the atmosphere by a filling connection formed in the piston rod guide, each of the filling connections including a check valve operable to selectively communicate the high-pressure or the low-pressure chamber to the atmosphere, wherein the filling connection to the low-pressure chamber is in the form of a filling bore, which is normally closed to prevent the escape of pressure from the low-pressure chamber to the atmosphere, and wherein the filling bore opens into a pressure relief bore opening into the low-pressure chamber, the pressure relief bore having one end provided with an O-ring check valve.

2. The spring strut according to claim 1, wherein at least one of the check valves comprises a rubber ball for closing the associated filling connection.

3. The spring strut according to claim 1, wherein at least one of filling connections is sealed off and/or closed by a plug.

4. The spring strut according to claim 1, wherein the check valves are formed in the piston rod guide.

5. The spring strut according to claim 1, wherein at least one of the check valves are formed on an interior space of the piston rod guide.

6. The spring strut according to claim 2, wherein the filling bore is closed by a rubber ball.

7. The spring strut according to claim 1, further comprising sealing members formed sealing the pressure relief bore from communicating to the atmosphere.

8. The spring strut according to claim 7, wherein at least one of the sealing elements is pretensioned by a spring.

9. The spring strut according to claim 6, wherein the rubber ball is held by concentrically arranged with a steel ball.

* * * * *